United States Patent [19]

Satoh

[11] Patent Number: 5,062,663
[45] Date of Patent: Nov. 5, 1991

[54] MODULE COVER OF AIR BAG SYSTEM
[75] Inventor: Takeshi Satoh, Shiga, Japan
[73] Assignee: Takata Corporation, Tokyo, Japan
[21] Appl. No.: 572,458
[22] Filed: Aug. 27, 1990

[30] Foreign Application Priority Data

Sep. 25, 1989 [JP] Japan .................................. 1-248682

[51] Int. Cl.⁵ ............................................ B60R 21/20
[52] U.S. Cl. ................................... 280/743; 280/731;
280/732
[58] Field of Search ............... 280/730, 731, 732, 728,
280/743

[56] References Cited

U.S. PATENT DOCUMENTS 3,756,617 9/1973 Brown .................................. 280/732
4,903,986 2/1990 Cok et al. ............................. 280/743

FOREIGN PATENT DOCUMENTS 0036137  3/1980  Japan ................................... 280/732
2210338  7/1989  United Kingdom .
2228719  5/1990  United Kingdom .

Primary Examiner—Charles A. Marmor
Assistant Examiner—Paul Dickson
Attorney, Agent, or Firm—Kanesaka and Takeuchi

[57] ABSTRACT

A module cover of an air bag system comprises a pair of cut-in-half bodies, end of each of which is fixed to the body side of the air bag system and the other ends which are free end engaged with each other openably, and a resin film disposed along the rear face of both cut-in-half bodies so as to stretch over both cut-in-half bodies. By the resin film attached to both cut-in-half bodies, the engagement state of the free ends of both cut-in-half bodies is maintained.

7 Claims, 9 Drawing Sheets

MODULE COVER OF AIR BAG SYSTEM

FIELD OF THE INVENTION AND RELATED ART STATEMENT

The present invention relates to an air bag system which is attached to a vehicle so that it may be expanded at the time of a vehicular crash to protect the passenger. More particularly, the present invention relates to a module cover of an air bag system which is excellent in tearing characteristics.

In an air bag system, a bag is folded and confined in a case named as a retainer, which is covered with a module cover. An air bag is rapidly expanded by gas supplied by an inflator. When the bag is expanded, a module cover of the air bag system tears as being pushed at its back by the bag and is opened into the vehicle compartment.

A conventional module cover of an air bag system has a fragile portion in order that the module cover tears along a predetermined line. As the fragile portion, for example, there is a continuous slot or a series of intermittent scores of slots formed along a line along which the module cover is expected to tear (a tear line). When the cover is made of a double-layer lamination structure comprising a hard layer and a soft layer, as the fragile portion, for example, there is a slot or a plurality of slots formed in the hard layer along a tear line.

In a conventional module cover of an air bag system with a tear line thinned in thickness, when external force is repeatedly given from the outside of the cover, there is a fear that the tear line is torn.

Further, when a conventional cover is made of a synthetic resin by metal mold casting, the metal mold is provided with a slit forming portion, and in order to form the slit (or slits) precisely by metal mold casting, the metal mold is required to be extremely precise. Still further, if the threshould strength of the tearing force is required to be changed by changing the depth of the slit (or slits) of the thin portion of the tear line, a large-scale change in the metal mold is necessary, and thus, a conventional cover has a fault that its tearing characteristics, etc. can not be easily changed.

OBJECT AND SUMMARY OF THE INVENTION

An object of the present invention is to provide a module cover of an air bag system wherein a metal mold for the module cover need not be precisely set.

Another object of the present invention is to provide a module cover of an air bag system which is excellent in tearing uniformly and at the same time, the design of which can be easily changed so that desired tearing characteristics may be acquired.

A module cover of an air bag system of the present invention comprises a pair of cut-in-half bodies, a base end of each of the cut-in-half bodies being fixed to the body side of an air bag system and the other end of each of the cut-in-half bodies being a free end engaged with each other openablly, and a resin film disposed along a rear face of both cut-in-half bodies so as to stretch over both cut-in-half bodies, wherein by the resin film attached to both cut-in-half bodies, the engagement state of the free ends of both cut-in-half bodies is maintained.

In a module cover of an air bag system, the engagement state of the free ends of a pair of cut-in-half bodies with each other is maintained by the resin film on the rear face. When the air bag is inflated and pushes the module cover to the compartment's side by tearing of the resin film disposed on the rear face of the pair of the cut-in-half bodies, release of the module cover begins. The resin film is disposed along the rear face of both cut-in-half bodies so as to stretch over both cut-in-half bodies, and by means of the resin film attached to the rear face of the cut-in-half bodies, the engagement state of the free ends of both cut-in-half bodies is maintained. And by tearing of the resin film, both cut-in-half bodies are released.

Thus, as cover is opened by the tearing of the resin film, by varying the capacity of the resin film to resist pressure, that is, by selecting an appropriate resin film among various thicknesses with or without slits, the tearing characteristics of the cover are easily determined. As the resin film with a uniform thickness can be made without difficulty by drawing or rolling, etc., and as slits of the resin film can be formed precisely and with ease, the tearing characteristics of the cover can be set with extreme ease according to the aim. Thus, a module cover of an air bag system is provided which is released easily when the air bag is actuated and inflated without fail at a predetermined pressure.

As abovementioned, as tearing characteristics of the cover can be set by determining the thickness of the resin film and whether the resin film has slits or not, the manufacturing of the cut-in-half bodies of the cover in itself does not require high-precision molding. Therefore, conventional members and operations for forming thin portions are not necessary, which makes the molding operation easy. Further, even when the tearing characteristics of the cover is changed, no change of the design of the cut-in-half bodies is required.

DESCRIPTION OF THE PREFERRED EMBODIMENTS

Figure 16:
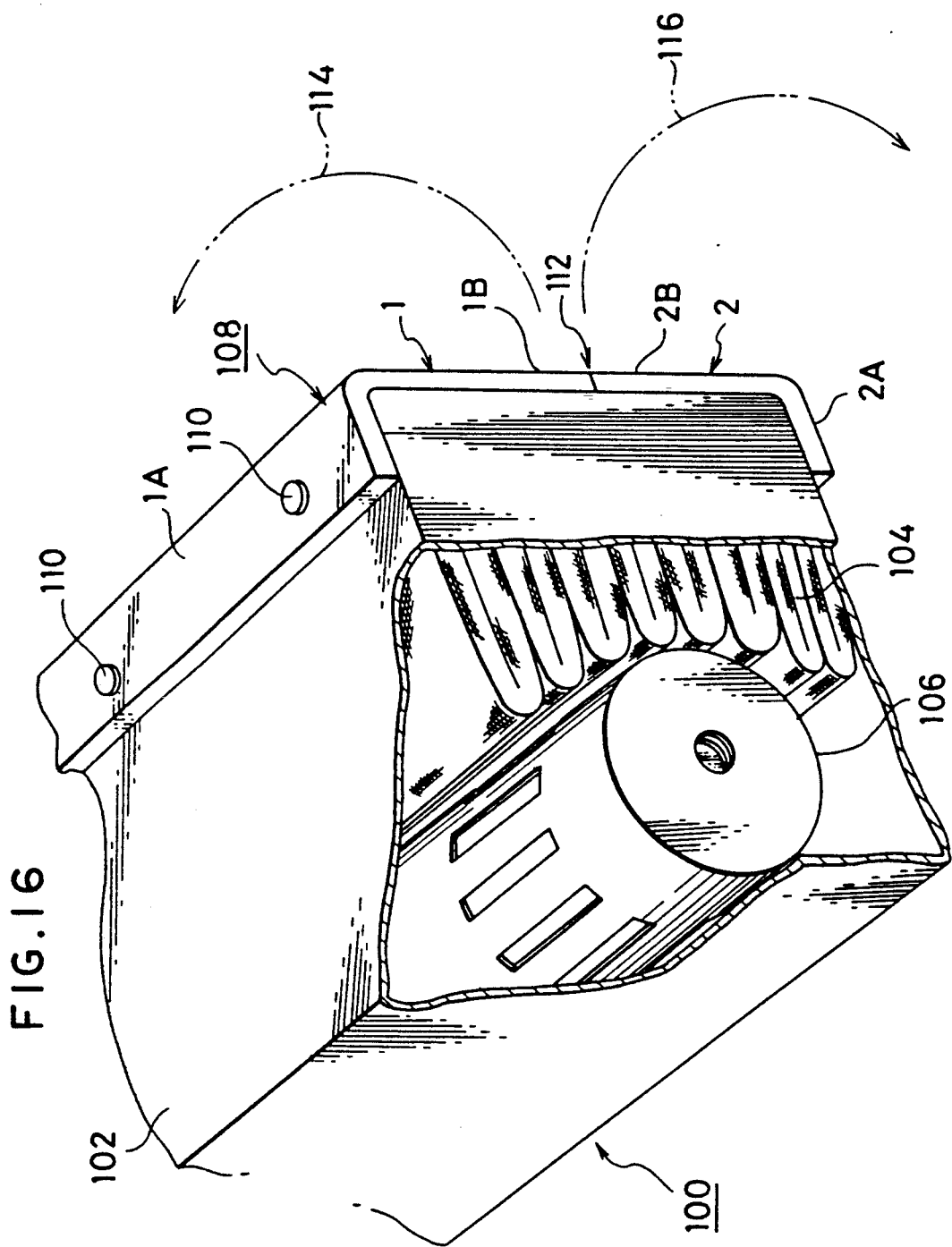
FIG. 16 is a perspective view with portions broken away of an air bag system provided with the module cover of FIG. 1.

As shown in FIG. 16, an air bag system 100 comprises a rectangular case 102 with its front face open, an air bag 104 confined in the case 102 in a folded state, an inflator 106 which supplys gas for expanding the air bag 104 rapidly, and a module cover 108 which covers the front opening of the case 102. The module cover 108 is fixed to the case 102 with rivets 110.

Figure 1:
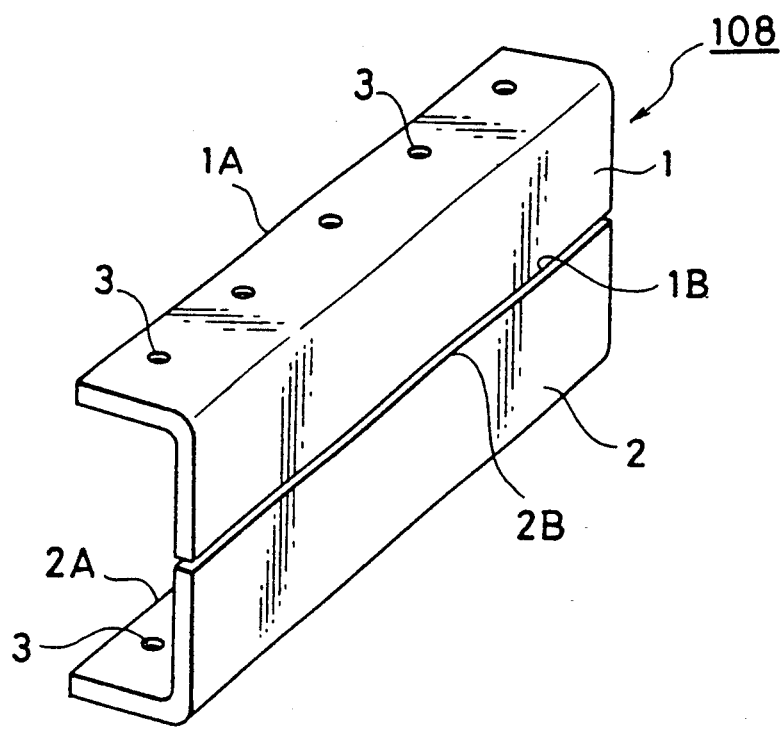
FIG. 1 is a perspective view of cut-in-half bodies of a module cover of an air bag system of an embodiment of the present invention.
Figure 2:
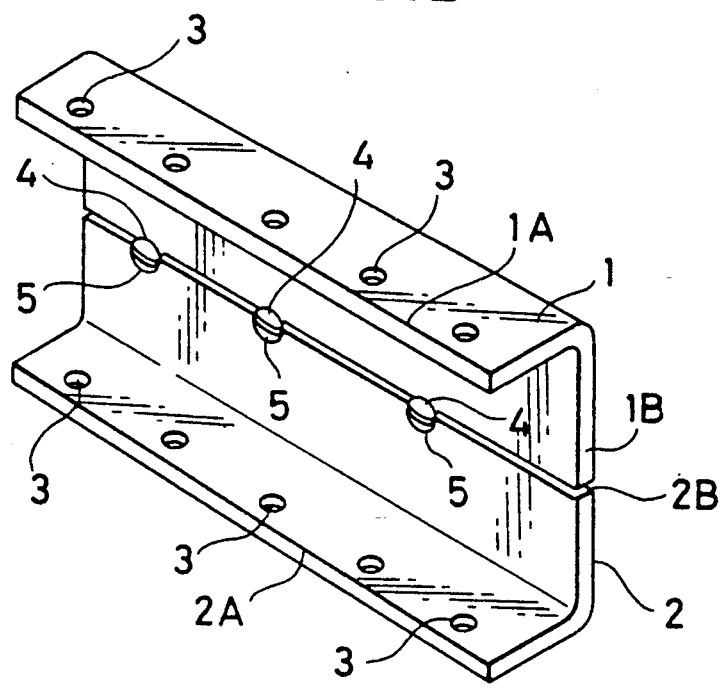
FIG. 2 is a rear perspective view of the cut-in-half bodies of FIG. 1.
Figure 3:
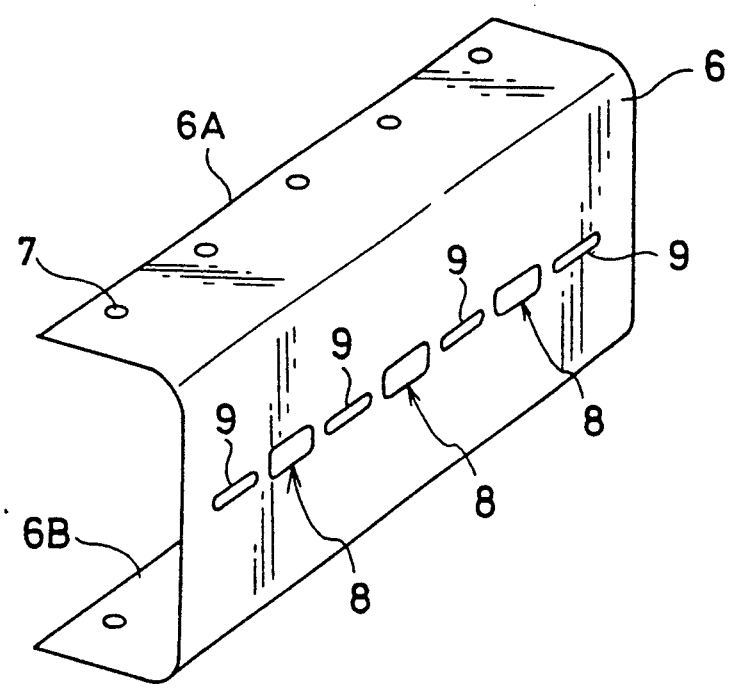
FIG. 3 is a perspective view of a resin film.

When the automobile collides, the inflator 106 is actuated and gas is spouted, by the pressure of which the air bag 104 is expanded rapidly. After the air bag 104 begins to expand, the module cover 108 devides into two directions at its center portion 112 and is opened as shown in the arrows 114 and 116, and the air bag 104 is inflated greatly into the inside of the compartment of the automobile. As shown in FIGS. 1 and 2, the module cover 108 comprises a pair of cut-in-half bodies 1 and 2. A plurality of holes 3 for screwing rivets 110 is disposed on the base end sides 1A and 2A of the cut-in-half bodies 1 and 2, respectively, so that the cut-in-half bodies 1 and 2 are fixed to the body side of the air bag system. The other ends 1B and 2B of the cut-in-half bodies 1 and 2 are free ends which are engaged with each other openablly to the side of the compartment.

Figure 4:
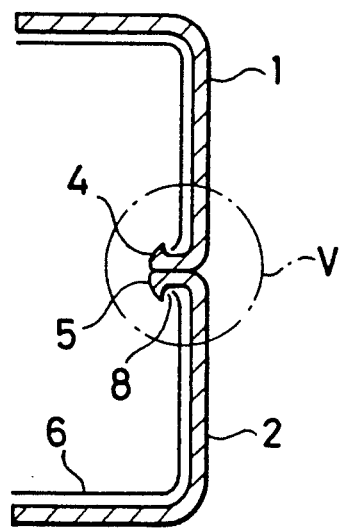
FIG. 4 is a sectional view of the module cover of the air bag system.
Figure 5:
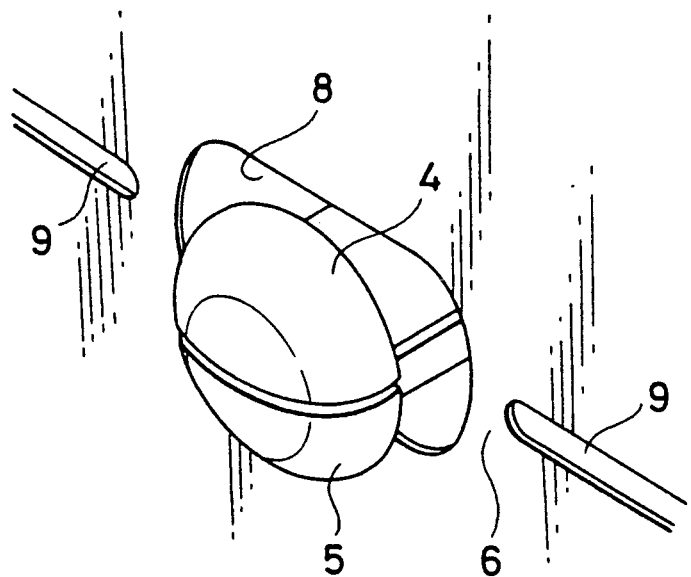
FIG. 5 is an enlarged perspective view of the portion V of FIG. 4.

A plurality of protrusions 4 and 5 is formed on the rear face of the free ends 1B and 2B of the cut-in-half bodies 1 and 2 so that each of the protrusions 4 and each of the opposite protrusions 5 form a pair. A resin film 6 is disposed along the rear face of the cut-in-half bodies 1 and 2 so as to stretch over both cut-in-half bodies 1 and 2 in its form, and on its base end sides 6A and 6B, a plurality of holes 7 for screwing is disposed so that the resin film 6 is fixed to the body side of the air bag system. The portions of the resin film 6 corresponding to the free ends 1B and 2B of the cut-in-half bodies 1 and 2, that is, the portions corresponding to the contact portions of the cut-in-half bodies 1 and 2, have, as shown in FIGS. 4 and 5, holes 8 corresponding to the protrusions 4 and 5 of the cut-in-half bodies 1 and 2 for maintaining the engagement state of the free ends 1B and 2B of the cut-in-half bodies 1 and 2 by passing through the protrusions 4 and 5 through the holes 8. Further, the resin film 6 has slits 9 for tearing the resin film 6 which are formed at the same level as the holes 8 for fixing.

As abovementioned, in the module cover of an air bag system shown in FIGS. 1 through 5, the engagement state of the free end sides of the cut-in-half bodies 1 and 2 is maintained by the engagement of the protrusions 4 and 5 formed on the rear face of the sides of free ends 1B and 2B of the cut-in-half bodies 1 and 2 with the holes 8 for fixing formed on the resin film 6 which film is disposed along the rear face of both cut-in-half bodies 1 and 2 so as to stretch over both cut-in-half bodies 1 and 2. In a module cover of an air bag system of this kind, when an air bag confined in it is actuated, inflated and expanded, pressure due to the expansion of the air bag is given to the resin film 6. By the pressure, the resin film 6 is torn from the portions where the holes 8 for fixing and slits 9 are formed (in the present embodiment, the line which links the holes 8 for fixing and the slits 9 is the tear line). By the tearing of the resin film 6, the engagement of the protrusions 4 with the protrusions 5 of the cut-in-half bodies 1 and 2 is released, and thus, the engagement of the free end 1B of the cut-in-half body 1 with the free end 2B of the cut-in-half body 2 is released, and the cut-in-half bodies 1 and 2 are released to the compartment's side from their free ends 1B and 2B. Then the air bag expands from the cover toward the compartment's side.

Figure 6:
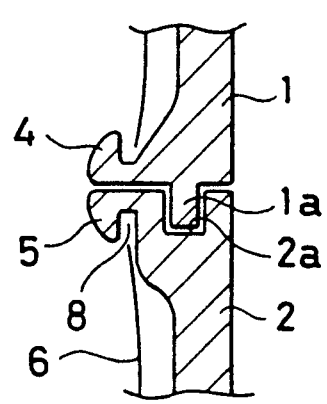
FIGS. 6 and 7 are sectional views showing other embodiments of the engagement state of the cut-in-half bodies.
Figure 7:
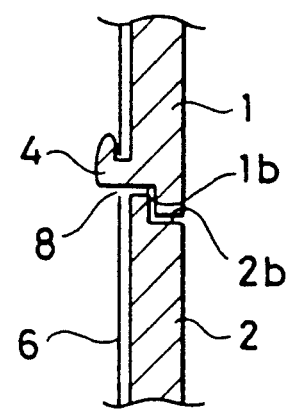

FIGS. 6 and 7 are sectional views showing other examples of engagement state of the cut-in-half bodies. The one shown in FIG. 6 stabilizes the engagement state of the cut-in-half bodies 1 and 2 by the engagement of a convex ridge 1a disposed on the contact face of the cut-in-half body 1 and a concave groove 2a disposed on the contact face of the other cut-in-half body 2. The one shown in FIG. 7 has a protrusion 4 only on one cut-in-half body 1 of the two bodies and forms cutouts 1b and 2b on both cut-in-half bodies 1 and 2. In a cover of the present embodiment, the engagement state of both cut-in-half bodies 1 and 2 is maintained by the engagement of the cut-in-half bodies 1 and 2 with each other at the cutouts 1b and 2b and the engagement of the protrusion 4 with a hole 8 for fixing of the resin film 6.

Figure 8:
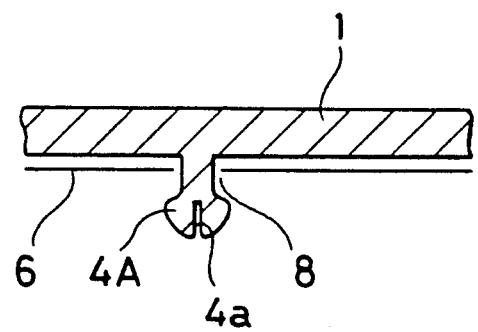
FIG. 8 is a sectional view showing another embodiment of the protrusion.
Figure 9:
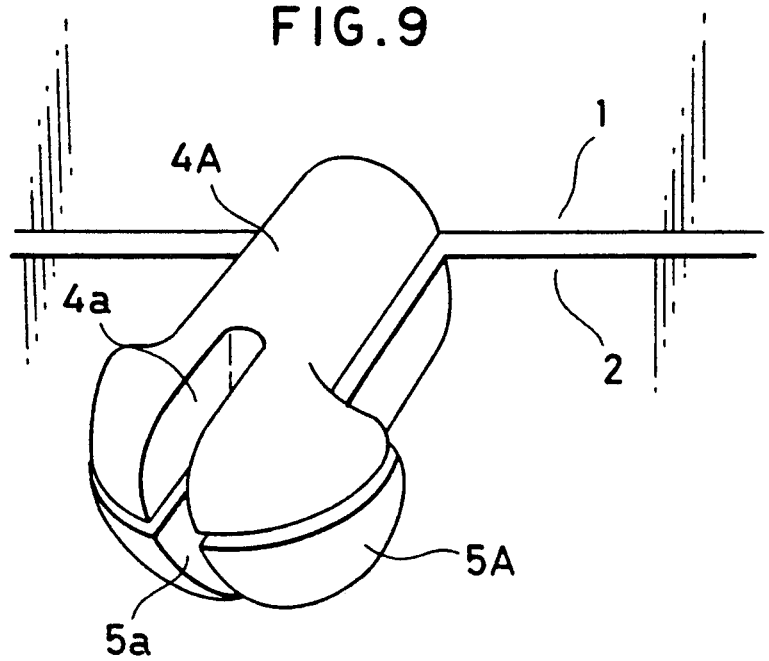
FIG. 9 is an enlarged perspective view of the protrusion of FIG. 8.

FIG. 8 (sectional view) and FIG. 9 (enlarged perspective view) show another example of a form of a protrusion formed on the rear face. Grooves 4a and 5a are formed in the center of protrusions 4A and 5A of this example.

Figure 10:
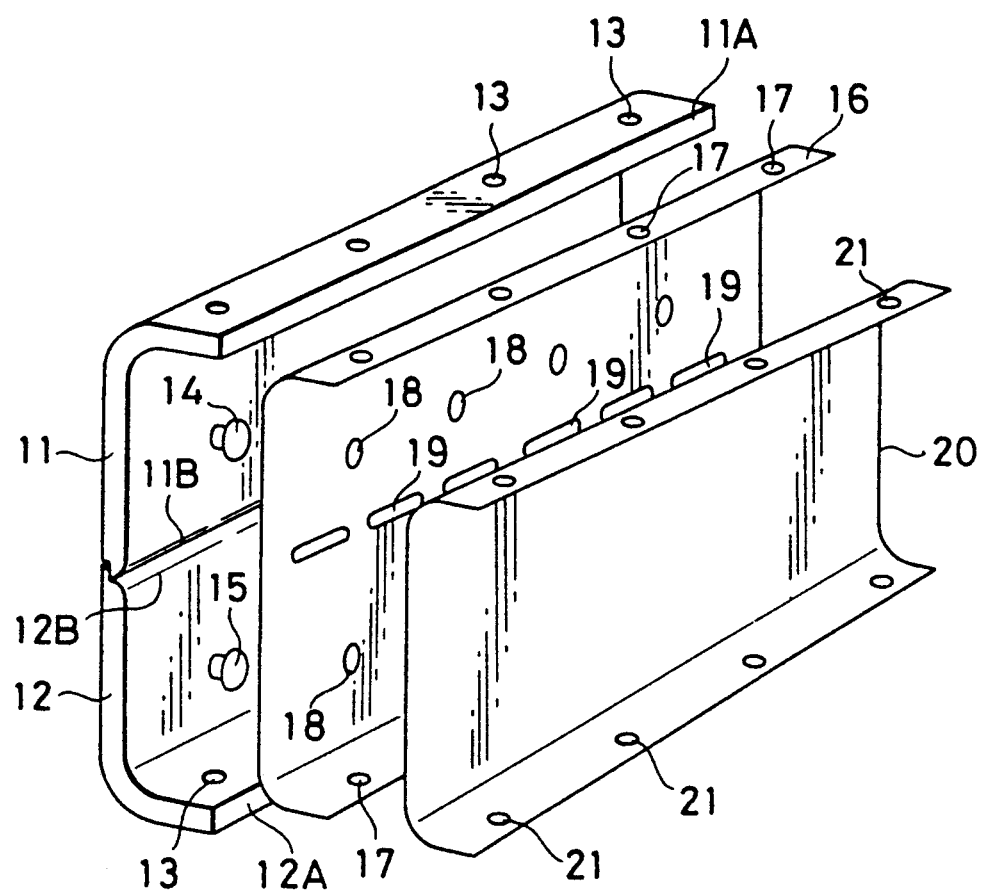
FIG. 10 is an exploded perspective view showing another embodiment of a module cover of an air bag system of the present invention.
Figure 11:
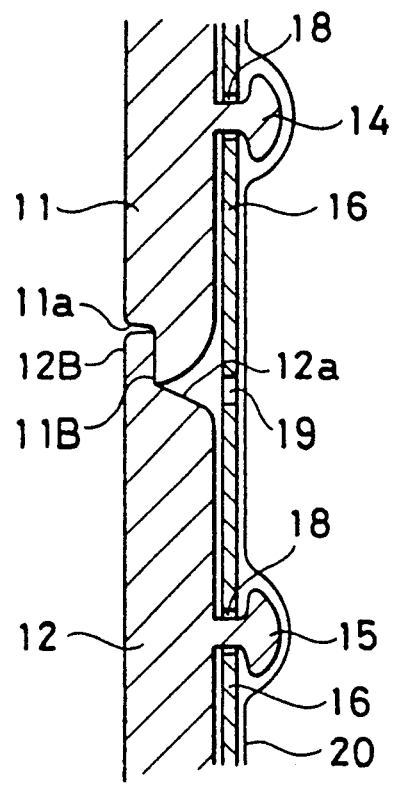
FIG. 11 is a partial sectional view of the embodiment of FIG. 10.
Figure 12:
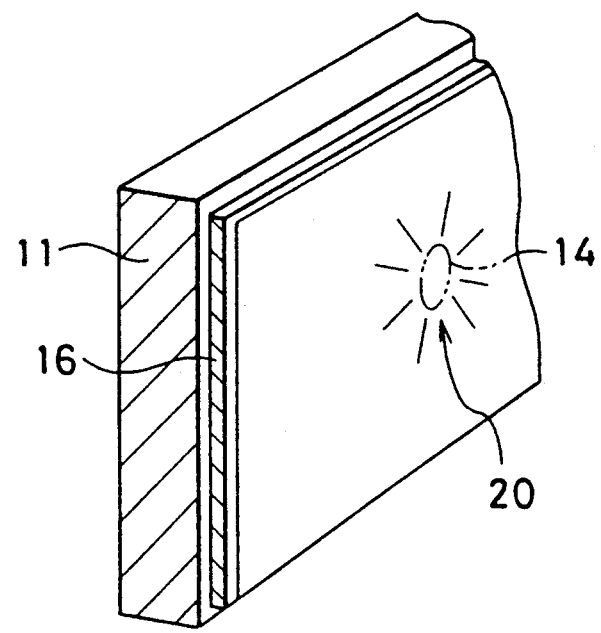
FIG. 12 is a partial rear perspective view of the embodiment of FIG. 10.

FIGS. 10 through 12 show another embodiment of a module cover of an air bag system of the present invention. FIG. 10 is an exploded perspective view showing the structure of the embodiment. FIG. 11 is a partial sectional view. FIG. 12 is a partial rear perspective view.

In a module cover of an air bag system of the present embodiment, a plurality of (in the present embodiment, 4 pairs of) protrusions 14 and 15 of cut-in-half bodies 11 and 12 is disposed around the center between free ends 11B and 12B and base ends 11A and 12A, and not disposed near the free ends 11B and 12B. Cutouts 11a and 12a are formed at contact portions of the free ends 11B and 12B, respectively, of the cut-in-half bodies 11 and 12.

Holes 18 for fixing the cut-in-half bodies 11 and 12 are disposed in a resin film 16 at the corresponding locations with those of the protrusions 14 and 15 of the cut-in-half bodies 11 and 12. By these, the resin film 16 is attached to the cut-in-half bodies 11 and 12. The portions of the resin film 16 corresponding to the free ends 11B and 12B, that is, corresponding to the contact portions of the cut-in-half bodies 11 and 12, have slits 19 for tearing the resin film 16. In the present embodiment, a cover film 20 is further disposed on the resin film 16. 13, 17 and 21 in the FIG. 10 are holes for screwing to fix the cut-in-half bodies 11 and 12, the resin film 16, and the cover film 20, respectively, to the body side of an air bag system.

In the module cover of an air bag system shown in FIGS. 10 through 12, the engagement state of both cut-in-half bodies 11 and 12 is maintained by the engagement of the protrusions 14 and 15 formed on the rear surface of the cut-in-half bodies 11 and 12 with the holes 10 for fixing formed in the resin film 16 disposed along the rear surface of both cut-in-half bodies 11 and 12 so as to stretch over both cut-in-half bodies 11 and 12.

The cover film 20 is disposed in order to prevent the air bag from being damaged by the protrusions 14 and 15 by covering the protrusions 14 and 15 of the cut-in-half bodies 11 and 12. The cover film 20 is made of a comparatively soft film. As the cover film 20 is softer than the resin film 16 and is very easy to be torn, it is not necessarily required to form slits, etc. for tearing in the cover film 20. However, it is needless to say that slits may be formed in the cover film 20, too. The cover film 20 is also effective in adjusting the tearing characteristics of the resin film 16.

Figure 15:
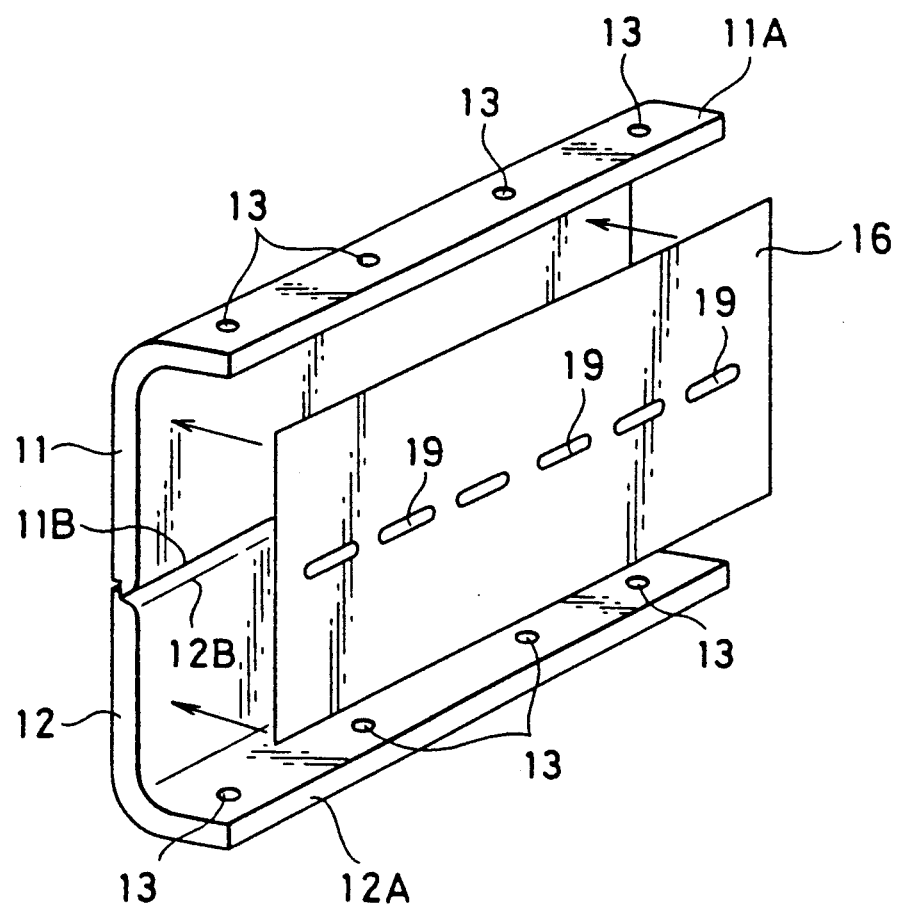
FIG. 15 is a perspective view showing another embodiment.

In a module cover of an air bag system of this kind, when an air bag confined in it is actuated, inflated and expanded, pressure by the expansion of the air bag is given to the cover film 20 and the resin film 16. By this pressure, the cover film 20 and the resin film 16 tear from the portions where the slits 19 are formed (in the present embodiment, a line that links the slits 19 is the tear line). As the engagement of the free end 11B of the cut-in-half body 11 with the free end 12B of the cut-in-half body 12 is released by the tearing of the resin film 16, the cut-in-half bodies 11 and 12 are released to the compartment side from the sides of the free ends 11B and 12B. Thus, the air bag expands from the cover to the compartment side without fail and well, without being disturbed by the cover, etc. In the present embodiment, the resin film 16 is attached to the cut-in-half bodies 11 and 12 by means of the protrusions 14 and 15 and the holes 18 for fixing. However, means for attaching is not limited to this, and means such as adhesion and welding may be used. FIG. 15 is a perspective view showing one example of adhering the resin film 16, which film 16 has slits 19. Other numerals in FIG. 15 designate identical parts in FIG. 12.

Figure 13:
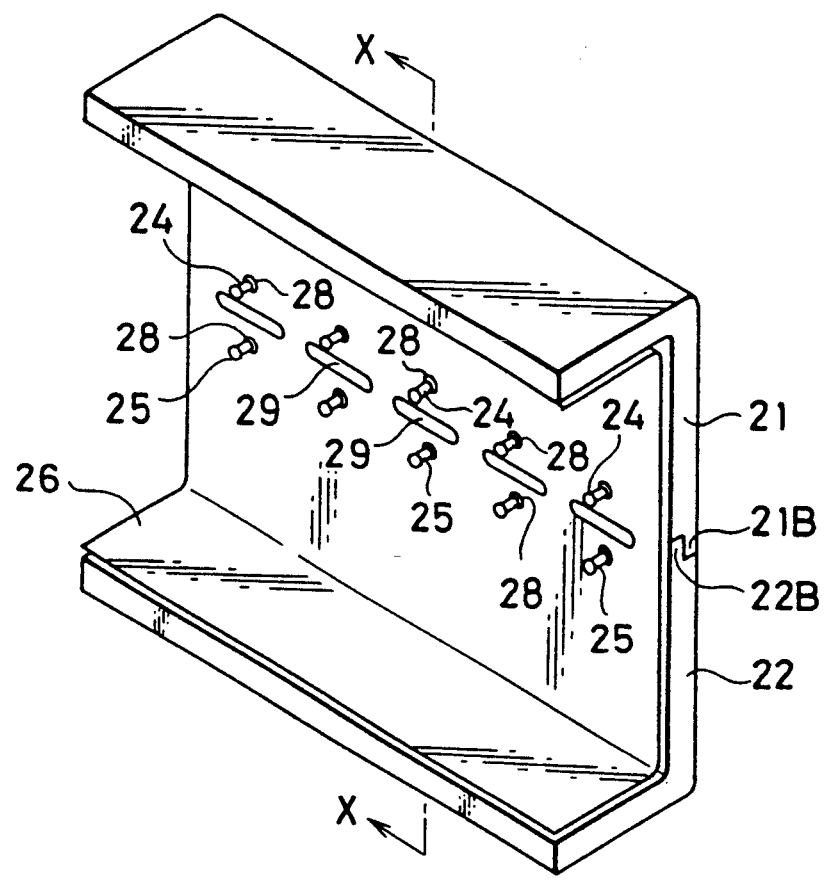
FIG. 13 is a perspective view showing another embodiment of a module cover of an air bag system of the present invention.
Figure 14:
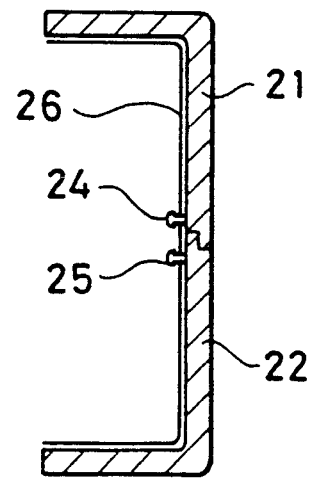
FIG. 14 is a sectional view taken along a line 14—14 of FIG. 13.

FIG. 13 is a perspective view showing another embodiment of a module cover of an air bag system of the present invention. FIG. 14 is a sectional view taken on the line 14—14 of FIG. 13. In a module cover of an air bag system of the present embodiment, a plurality of pin-shaped protrusions 25 is disposed on the rear face adjacent to a free end 22B of a cut-in-half body 22 at opposite location to the protrusions 24 (in the present embodiment, five protrusions 24 and five protrusions 25 are formed on the cut-in-half body 21 and 22). Holes 28 for fixing are formed in the resin film 26 at locations corresponding to the protrusions 24 and 25. Slits 29 are formed in the resin film 26 at locations corresponding to the free ends 21B and 22B of the cut-in-half bodies 21 and 22, the line of which is a tear line.

In the module cover of an air bag system of the present embodiment, when an air bag is inflated and expanded by the tearing of the resin film 26 at the slits 29, the engagement of the cut-in-half bodies 21 and 22 is released, a cover is opened, and the air bag is inflated and expanded toward the compartment's side.

A module cover of an air bag system of the present invention is not at all limited to the embodiments shown in the drawings. It is possible that a module cover of the present invention adopts various kinds of other aspects with respect to the form of the cut-in-half bodies, the form of the engagement portions, the form, the locations and the number of the protrusions formed on the rear face of the cut-in-half bodies, whether or not the resin film has slits, and if any, the locations of the slits, etc., and of course, the material of each member.

A module cover of an air bag system of the present invention can be easily manufactured by metal-molding the cut-in-half bodies and by drawing or rolling the resin film and processing the resin film to form openings and slits.

As abovementioned in detail, a module cover of an air bag system of the present invention can be industrially mass-produced at a low price, as a precise metal mold for its manufacturing is not required.

Moreover, with the present invention, the tearing characteristics of a module cover can be set freely, and at the same time, the tearing characteristics of a manufactured module cover correspond exactly with the required values.

I claim:

1. A module cover adapted for covering a front opening of a case in which a folded air bag is confined and an inflator for providing gas to inflate and expand the air bag is disposed, comprising;

a pair of cut-in-half bodies each of which covers half of said front opening of said case and has a rear face and one edge, said one edge of one of said cut-in-half bodies contacting with one edge of the other of said cut-in-half bodies, edge portions of the cut-in-half bodies opposite to said one edges being attached to said case, at least one of said cut-in-half bodies having protrusions protruding from said rear face; and a resin film disposed so as to stretch over the rear face of one of said cut-in-half bodies and the rear face of the other of said cut-in-half bodies, said resin film having holes in which said protrusions are inserted so that said film is engaged with the cut-in-half bodies, and when said inflator is not actuated, said film maintaining contact with the cut-in-half bodies and allowing engagement state between said cut-in-half bodies for making said cut-in-half bodies an integral module cover, and when said inflator is actuated and said air bag is expanded, said film permitting said engagement between said cut-in-half bodies to be released and said one edges of said cut-in-half bodies to be opened so as to move away from said case.

2. The module cover of claim 1 wherein said protrusions are disposed at said one edges of both cut-in-half bodies, said protrusions of both cut-in-half bodies overlap each other, and said overlapped protrusions are inserted in one of said holes of said film.

3. The module cover of claim 1 wherein said protrusions are disposed only at said one edge of one of said cut-in-half bodies.

4. The module cover of claim 1 wherein said protrusions are disposed between said one edges and edge portions opposite to said edges.

5. The module cover of claim 1 wherein slits are formed on said film to be disposed along said one edges of said cut-in-half bodies contacting with each other and said slits promote said film to tear along said one edges when said air bag expands and pressure from said air bag is given to said film.

6. The module cover of claim 1 wherein said resin film is covered with a cover film.

7. The module cover of claim 6 wherein said cover film is made of a material which is softer and easier to tear than the material of said resin film.

* * * * *